(12) United States Patent
Park et al.

(10) Patent No.: US 8,089,677 B2
(45) Date of Patent: Jan. 3, 2012

(54) DYNAMIC OPTICAL GRATING DEVICE AND ASSOCIATED METHOD FOR MODULATING LIGHT

(75) Inventors: Yeonjoon Park, Yorktown, VA (US); Sang H. Choi, Poquoson, VA (US); Glen C. King, Yorktown, VA (US); Sang-Hyon Chu, Newport News, VA (US)

(73) Assignee: The United States of America as represented by the Administrator of the National Aeuronautics and Space Administration, Washington, DC (US)

( * ) Notice: Subject to any disclaimer, the term of this patent is extended or adjusted under 35 U.S.C. 154(b) by 423 days.

(21) Appl. No.: 12/135,180

(22) Filed: Jun. 8, 2008

(65) Prior Publication Data

US 2009/0303598 A1    Dec. 10, 2009

(51) Int. Cl.
G02F 1/01 (2006.01)

(52) U.S. Cl. .................................... 359/240; 359/248

(58) Field of Classification Search ............... 359/240; 349/141
See application file for complete search history.

(56) References Cited

U.S. PATENT DOCUMENTS

| 6,111,560 | A * | 8/2000 | May ........................... 345/102 |
| 6,525,860 | B1 * | 2/2003 | Holz et al. .................. 359/251 |
| 2007/0015848 | A1 * | 1/2007 | Sun et al. .................... 523/160 |
| 2007/0103629 | A1 * | 5/2007 | Li ................................. 349/123 |
| 2009/0040885 | A1 * | 2/2009 | Horimai ..................... 369/30.03 |

* cited by examiner

*Primary Examiner* — Ricky Mack
*Assistant Examiner* — James Jones
(74) *Attorney, Agent, or Firm* — Thomas K. McBride, Jr.; Helen M. Galus; Linda B. Blackburn

(57) ABSTRACT

A dynamic optical grating device and associated method for modulating light is provided that is capable of controlling the spectral properties and propagation of light without moving mechanical components by the use of a dynamic electric and/or magnetic field. By changing the electric field and/or magnetic field, the index of refraction, the extinction coefficient, the transmittivity, and the reflectivity of the optical grating device may be controlled in order to control the spectral properties of the light reflected or transmitted by the device.

9 Claims, 6 Drawing Sheets

DYNAMIC OPTICAL GRATING DEVICE AND ASSOCIATED METHOD FOR MODULATING LIGHT

ORIGIN OF THE INVENTION

This invention was made in part by employees of the United States Government and may be manufactured and used by or for the Government of the United States of America for governmental purposes without the payment of any royalties thereon or therefor.

FIELD OF THE INVENTION

The present invention generally relates to optical devices and, more particularly, relates to optical grating devices.

BACKGROUND OF THE INVENTION

A grating (sometimes termed a diffraction grating) is a light-modulating optical component with a surface covered by a regular pattern of parallel lines, typically with a distance between the lines comparable to the wavelength of light. Gratings are commonly used in spectrum analyzers, diffractometers, spectrometers, and optical beam steering devices for display units. Light rays that pass through such a surface are bent as a result of diffraction, related to the wave properties of light. This diffraction angle depends on the wavelength of the light. Alternatively, the grating may have a regular pattern of fixed mirrors (or other highly reflective surface) such that the reflected light is diffracted as desired. One drawback of such fixed gratings is that their spectral properties cannot be changed (i.e., such gratings are non-dynamic).

Microelectromechanical systems (MEMS) grating devices exist that are able to dynamically control the spectral properties. Such a device consists of a number of aluminium-coated ribbons suspended over a thin air gap. Each ribbon can be pulled down a controlled distance into the air gap by means of an electrostatic charge. When all the ribbons in a pixel are in their rest state, their aluminum coatings act as a mirror, reflecting light away from the projector's optical path. If alternate ribbons in a pixel are pulled down, a square-well diffraction grating is formed in which each well has a depth equal to a fraction of the wavelength of light. Light waves reflecting off adjacent "up" and "down" ribbons are therefore out of phase with each other, different wavelengths by differing amounts. This causes the waves to interact in a way which causes each frequency of light to radiate from the pixel at a different angle. By varying the width, separation and degree of pull-down of the ribbons in each pixel, the spectral properties of the light can be controlled. While such MEMS gratings are dynamic, the speed with which the spectral properties can be changed is limited by the weight, spring constant, and driving forces of the components. Further, having such moving mechanical parts can result in deterioration of the moving parts due to friction and stress.

As such, it would be desirable to have an optical grating device capable of dynamically and rapidly changing the spectral properties of reflected or transmitted light, without moving parts.

BRIEF SUMMARY OF THE INVENTION

The object of the present invention is to overcome the aforementioned drawbacks of current optical gratings and to provide a dynamic optical grating device and associated method for modulating light capable of controlling the spectral properties and propagation of light without moving mechanical components by the use of a dynamic electric and/or magnetic field. By changing the electric field and/or magnetic field, the index of refraction, the extinction coefficient, the transmittivity, and the reflectivity of the optical grating device may be controlled in order to control the spectral properties of the light reflected or transmitted by the device.

In one embodiment of the invention, a dynamic optical grating device comprises an array of pixels and electrical circuitry configured to apply a desired electric or magnetic field to the pixels. Each pixel comprises an active media material configured to change at least one optical property upon application of an electric or magnetic field. The active media material may be selected from the group consisting of intrinsic semiconductor, extrinsic semiconductor, ceramic, organic molecules, non-linear optical crystal, liquid crystal, ferroelectric material, and piezoelectric material. The optical property may be selected from the group consisting of index of refraction, extinction coefficient, transmittivity, and reflectivity.

The grating device may further comprise a substrate supporting the pixel array, the substrate comprising a reflective material or a transparent material. The grating device may further comprise an opaque material defining a domain of each pixel. The opaque material may comprise a singular grid-like structure. Alternatively, for example, the opaque material may comprise first and second pluralities of substantially parallel structures, the first plurality being substantially perpendicular to the second plurality.

The electrical circuitry may comprise first and second pluralities of substantially parallel conductive electrodes, each plurality on an opposite side of the pixel array, the first plurality being substantially perpendicular to the second plurality. Each electrode of the first plurality may be configured to apply a voltage to a different column of pixels and each electrode of the second plurality may be configured to apply a voltage to a different row of pixels, such that one electrode of the first plurality and one electrode of the second plurality together apply a desired voltage to one pixel. The electrical circuitry may further comprise first and second pluralities of semiconductor elements located between the active media material and the first and second pluralities of electrodes, respectively.

In an alternative embodiment of the invention, a dynamic optical grating device comprises an active media material layer configured to change at least one optical property upon application of an electric or magnetic field, and first and second field injection layers on opposite sides of the active media layer configured to apply a desired electric or magnetic field to the active media material layer. The active media material layer may be selected from the group consisting of intrinsic semiconductor, extrinsic semiconductor, ceramic, organic molecules, non-linear optical crystal, liquid crystal, ferroelectric material, and piezoelectric material.

The grating device may further comprise a substrate layer supporting the active media material layer and the first and second field injection layers, the substrate comprising a reflective material or a transparent material. The grating device may further comprise an opaque layer defining a plurality of apertures.

The first and second field injection layers may comprise, respectively, first and second transparent conductive electrodes, the first electrode being configured to apply a first voltage and the second electrode being configured to apply a second voltage such that the first and second electrodes together apply a desired voltage to the active media material layer. The first and second field injection layers may further comprise first and second semiconductor layers located between the active media material and the first and second electrodes, respectively.

In addition to the dynamic optical grating device as described above, other aspects of the present invention are directed to corresponding methods for modulating light via a dynamic optical grating device.

BRIEF DESCRIPTION OF THE DRAWINGS

Figure 1:
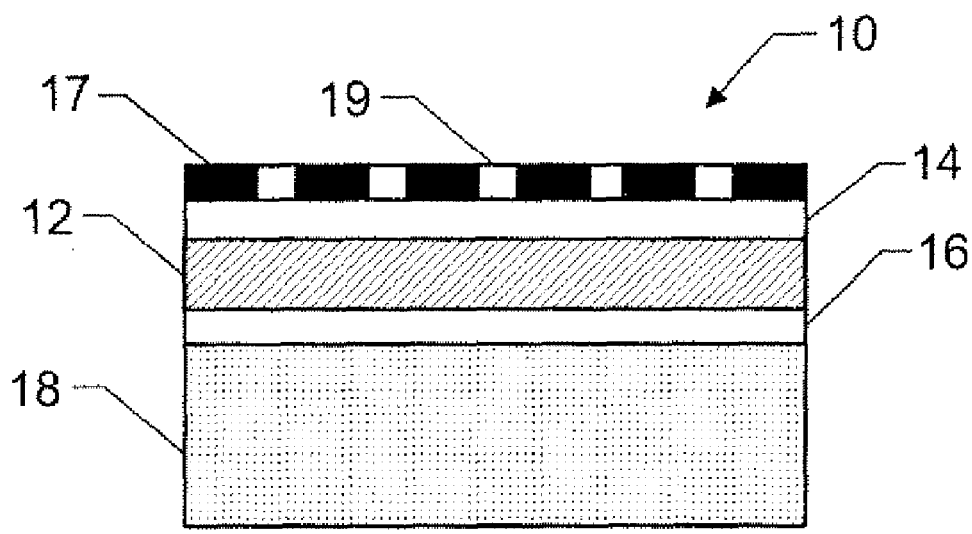
Figure 2:
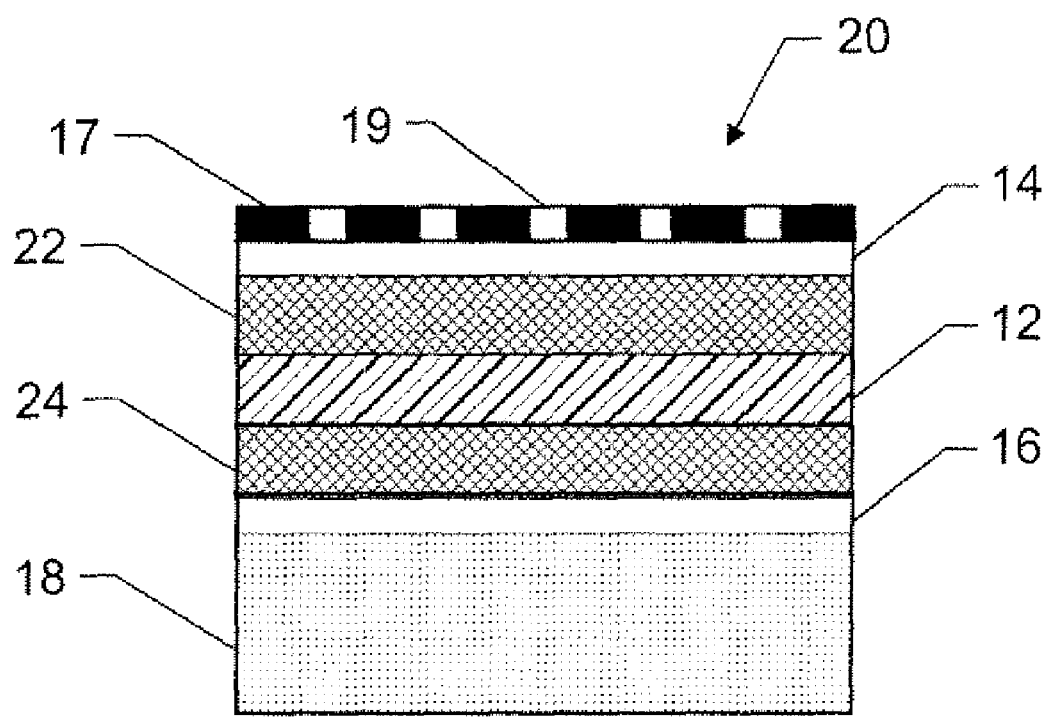
Figure 3A:
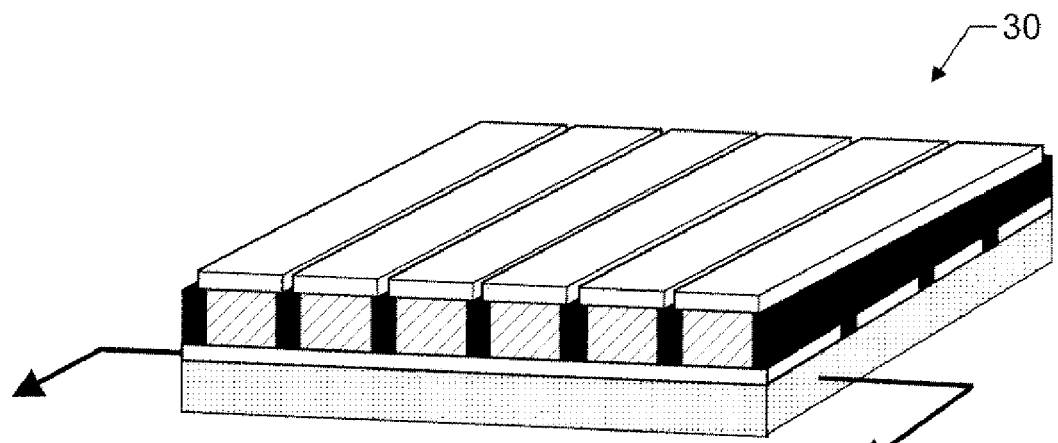
Figure 3B:
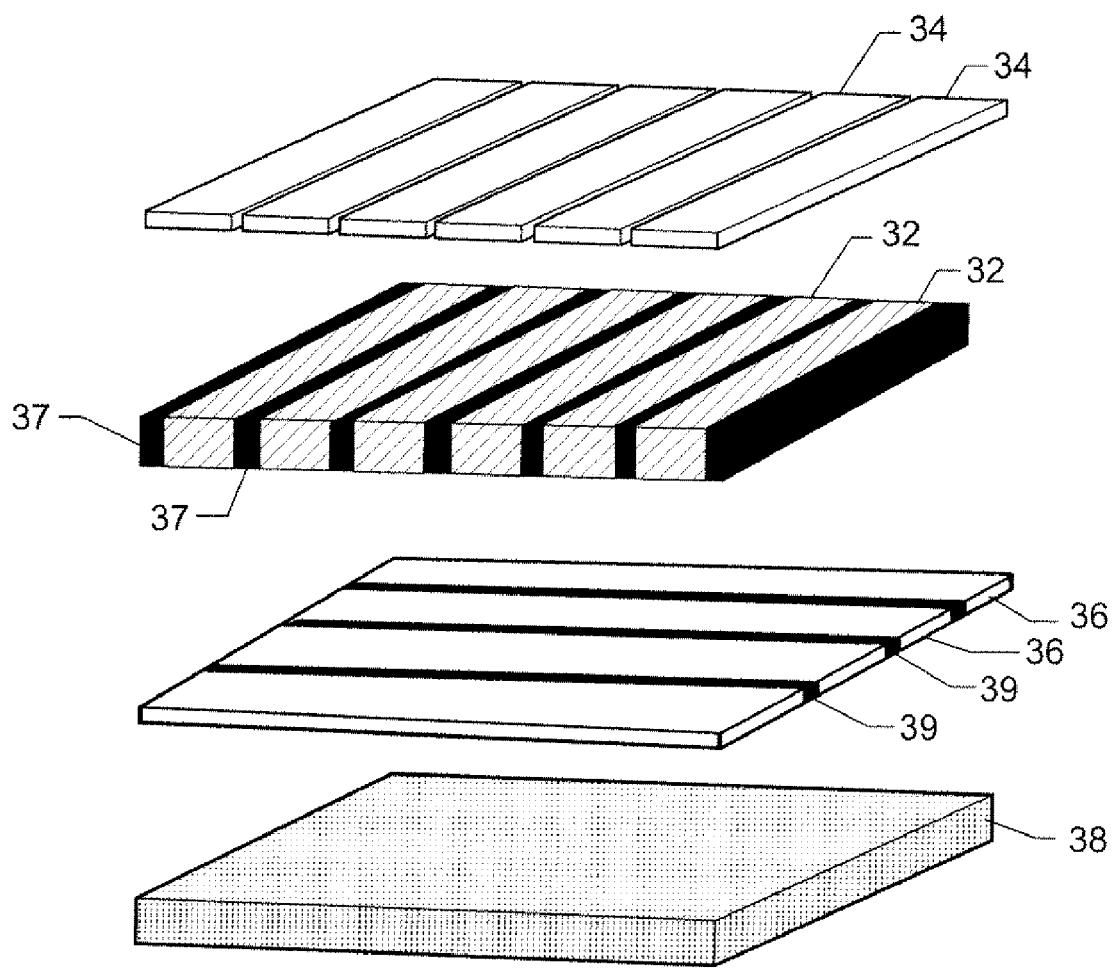
Figure 4A:
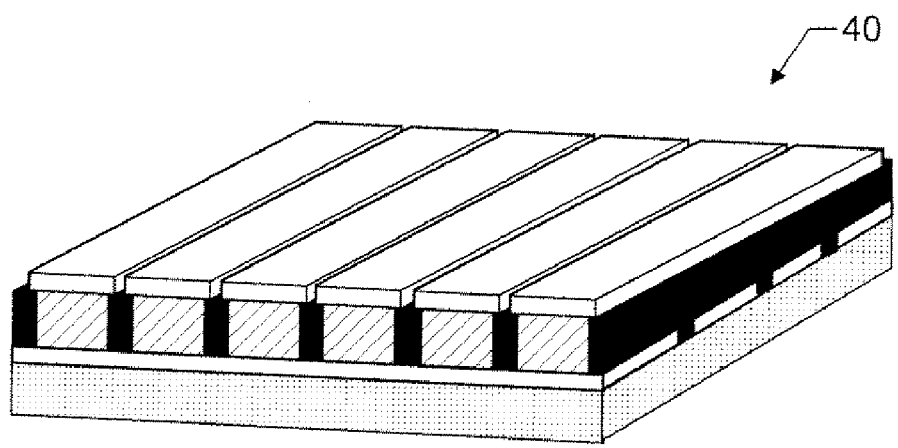
Figure 4B:
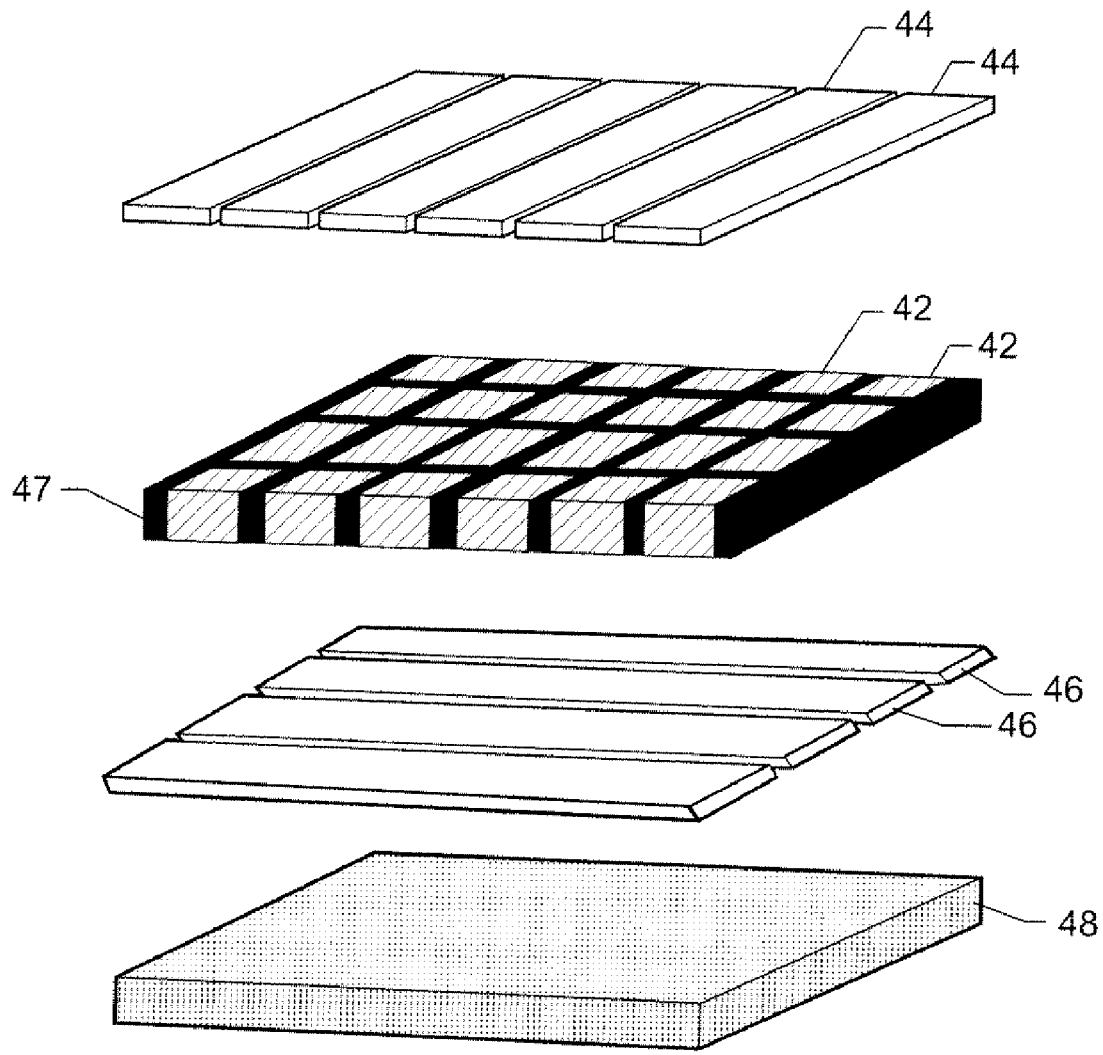
Figure 5A:
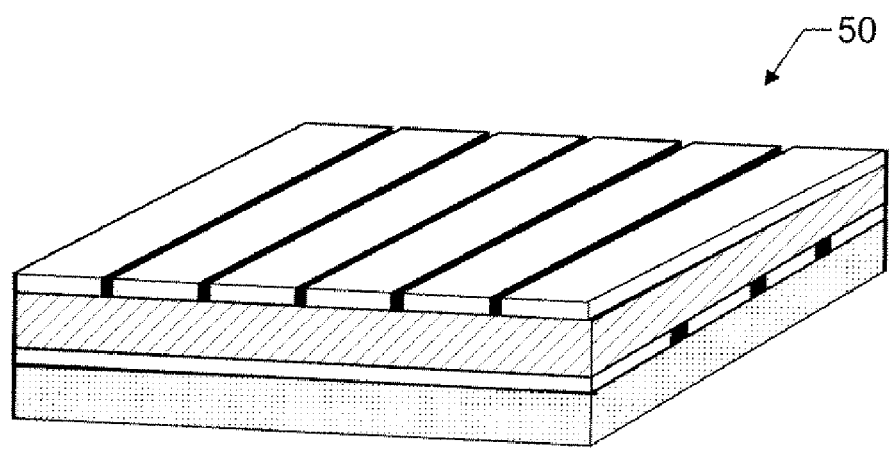
Figure 5B:
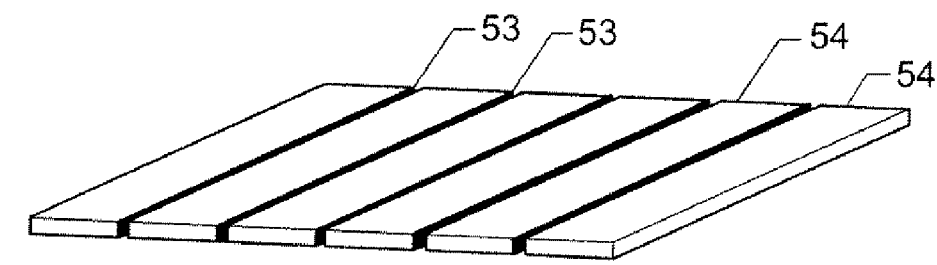
Figure 5B:
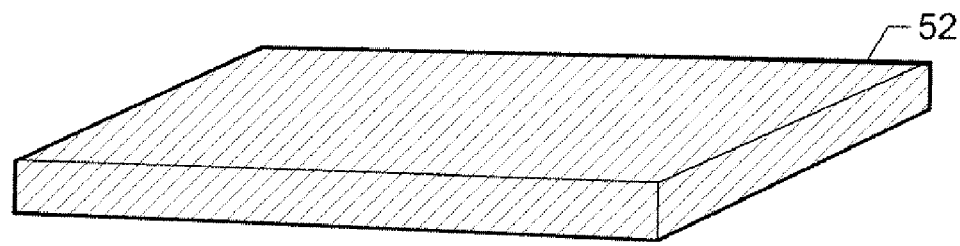
Figure 5B:
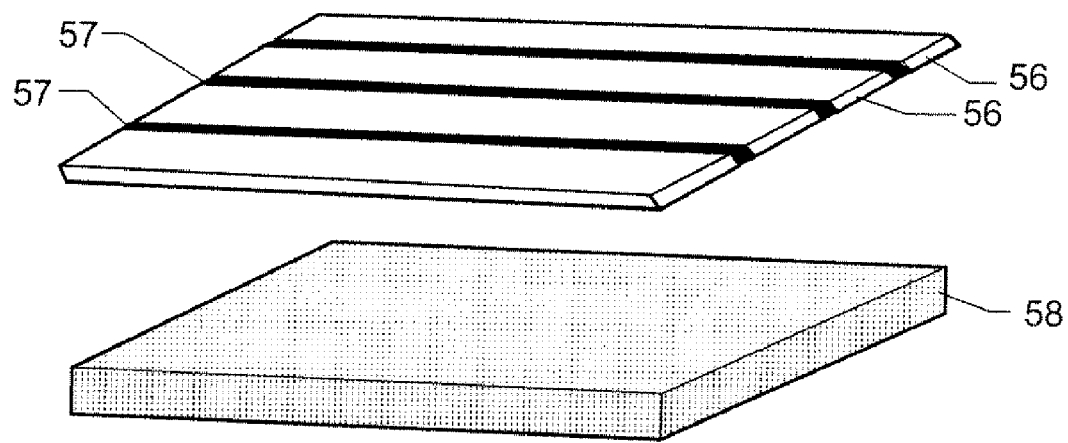
Figure 6:
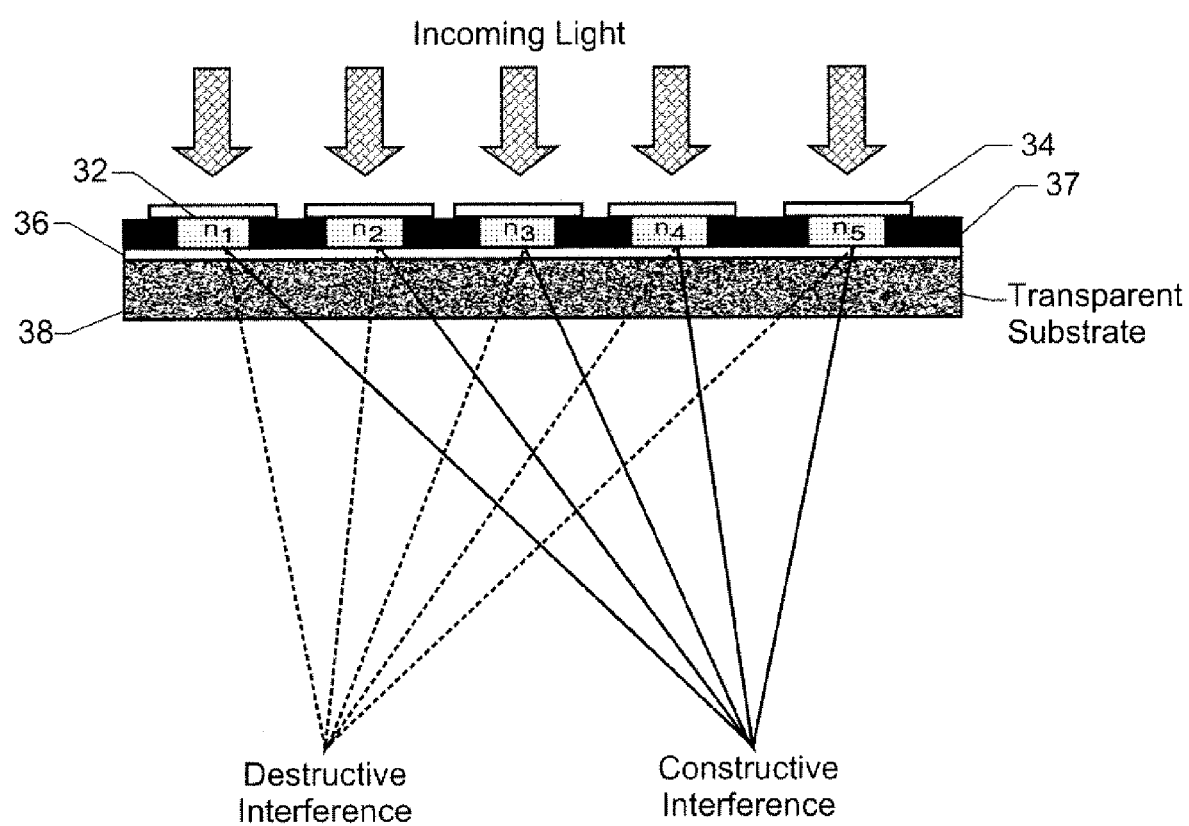
Figure 7:
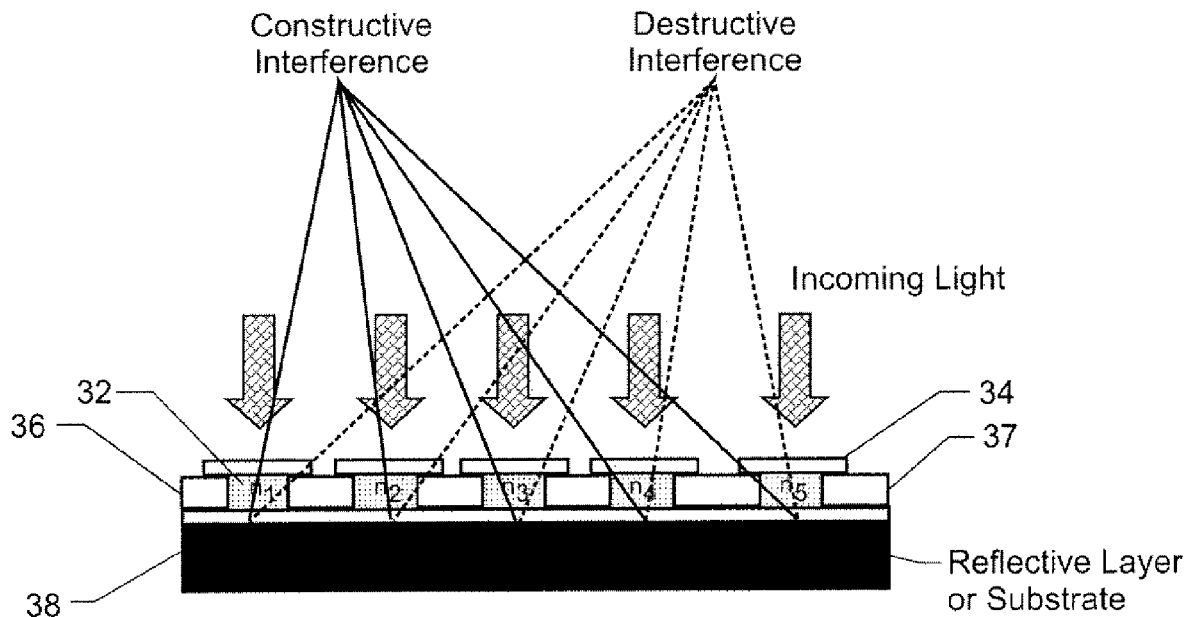
Figure 8:
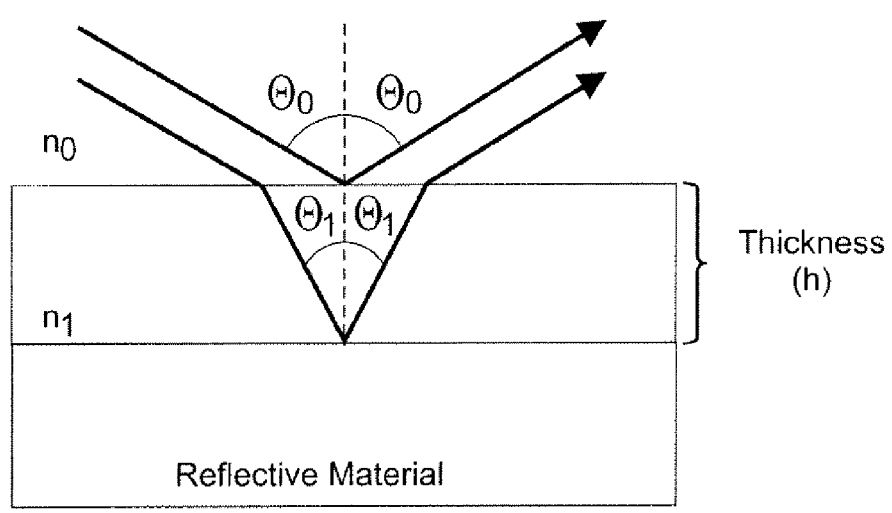

Having thus described the invention in general terms, reference will now be made to the accompanying drawings, which are not necessarily drawn to scale, and wherein:

FIG. 1 is a cross-sectional view of one pixel and associated elements of a dynamic optical grating device, in accordance with one embodiment of the invention;

FIG. 2 is a cross-sectional view of one pixel and associated elements of a dynamic optical grating device, in accordance with an alternative embodiment of the invention;

FIG. 3A is a perspective view of a dynamic optical grating device, in accordance with one embodiment of the invention;

FIG. 3B is an exploded view of the dynamic optical grating device of FIG. 3A;

FIG. 4A is a perspective view of a dynamic optical grating device, in accordance with an alternate embodiment of the invention;

FIG. 4B is an exploded view of the dynamic optical grating device of FIG. 4A;

FIG. 5A is a perspective view of a dynamic optical grating device, in accordance with an alternate embodiment of the invention;

FIG. 5B is an exploded view of the dynamic optical grating device of FIG. 5A;

FIG. 6 is a cross-sectional view of a portion of the dynamic optical grating device of FIG. 3A with a transparent substrate, illustrating the modulation of light through the pixels;

FIG. 7 is a cross-sectional view of a portion of the dynamic optical grating device of FIG. 3A with a reflective substrate, illustrating the modulation of light through the pixels; and FIG. 8 illustrates the propagation of light by media having different indices of refraction.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A dynamic optical grating device of the present invention may comprise a single unit or pixel, or an array of pixels. FIG. 1 illustrates a cross-sectional view of one pixel 10 and associated elements of a dynamic optical grating device, in accordance with one embodiment of the invention. Each pixel comprises an active media material layer 12. One or more optical properties of the active media layer (e.g., index of refraction, extinction coefficient, transmittivity, and/or reflectivity) change upon application of an electric or magnetic field to the active media material layer. By changing the optical property(ies) of the active media layer, the spectral properties and propagation of light passing through the pixel can be controlled (modulated). The active media material may be selected from the group consisting of intrinsic (pure or undoped) semiconductor, extrinsic (lightly or moderately doped) semiconductor, ceramic, organic molecules, non-linear optical crystal, liquid crystal, ferroelectric material, and piezoelectric material. This device can function as a single pixel or in the form of a pixel array to make constructive or destructive interference. In the array device, the phase and the intensity of light from each pixel is controlled by the applied electric field and/or magnetic field.

Each pixel further comprises a light blocking layer 17, in which an array of very small apertures 19 are defined to allow photons to pass through to the structure below. The light blocking layer 17 can be made of thin films, including but not limited to metal, semiconductor, and/or dielectric films. The size of the apertures is typically less than one quarter of a wavelength of a light wave expected to impinge upon the device. A quantum plasmon interaction in the thin metallic film can be also used to control the spectral properties of the transmitted light.

Associated with each pixel is electrical circuitry configured to apply a desired electric or magnetic field to the pixels, thereby changing one or more optical properties of the light passing through the pixels. In the embodiment of FIG. 1, the electrical circuitry comprises a first transparent electrode 14 and a second transparent electrode 16 on opposite sides of the active media layer. The transparent electrodes may be generically termed "field injection layers." The first electrode is configured to apply a first voltage and the second electrode is configured to apply a second voltage, such that the first and second electrodes together apply a desired voltage difference to the active media material layer in order to apply an electric field and/or to flow an electric current. The additional circuitry needed to enable and control the voltage applied by the electrodes is known to those skilled in the art and is not illustrated.

The first field injection layer may comprise thin conductive films that can transmit light and apply an electric field to the semiconductor layers (discussed below) and/or to the active media layer, including but not limited to indium tin oxide (ITO), thin metal film, and p-glass silicon. The second field injection layer may comprise thin conductive films that can transmit and/or reflect light and apply an electric field to the semiconductor layers and/or to the active media layer, including but not limited to indium tin oxide (ITO), thin metal film, and n/p-doped semiconductor.

The pixel and associated electrical circuitry may be supported by a substrate 18, which may comprise either a reflective material or a transparent material. The transparent or reflective layer, and/or substrate, supports the above layers in the epitaxial growth (i.e., during production of the device) and gives an optical function to reflect the light or transmit the light. If the substrate is transparent, light coming through the pixel from the top ("top" and "bottom" are used for descriptive purposes only and are not intended to be limiting) will be modulated and exit the bottom of the pixel. If the substrate is reflective, light coming through the pixel from the top will be modulated, reflected, modulated again, and exit the top of the pixel. If it is necessary or desirable, the second field injection layer can be merged with the substrate into one single layer.

FIG. 2 illustrates a cross-sectional view of one pixel 20 and associated elements of a dynamic optical grating device, in accordance with an alternative embodiment of the invention. The pixel of FIG. 2 is similar to that of FIG. 1, but with additional layers. The pixel of FIG. 2 has a first semiconductor layer 22 between the first field injection layer 14 and the active media layer 12, and a second semiconductor layer 24 between the active media layer 12 and the second field injection layer 16. The semiconductor layers cause increased light modulation. The first semiconductor layer may be an n-type semiconductor and the second semiconductor layer may be a p-type semiconductor. Alternatively, for example, the first semiconductor layer may be a p-type semiconductor and the second semiconductor layer may be an n-type semiconductor. However, the two semiconductor layers cannot both be p-type or both be n-type.

Embodiments of the invention are not limited to the layers/structures described above, and some layers/structures can be added or removed as desired to enhance the electric and magnetic control over the spectral distribution of the transmitted light.

As mentioned above, the present invention can function as a single pixel or in the form of a pixel array. Referring now to FIGS. 3A and 3B, perspective and exploded views of a dynamic optical grating device are illustrated, in accordance with one embodiment of the invention. The device of FIGS. 3A and 3B have a similar layer structure as that of FIG. 1 (or, alternatively, for example, could have a similar layer structure as that of FIG. 2), but further comprises an opaque material that defines a domain (i.e., physical boundary) of each pixel thereby creating a 4×6 array of pixels. The device 30 of FIGS. 3A and 3B comprises a plurality of substantially parallel, relatively long, active media elements 32 interspersed between a first plurality of substantially parallel opaque elements 37. The device further comprises electrical circuitry for applying a voltage to the active media elements, the electrical circuitry comprising a first plurality of substantially parallel conductive electrodes 34 and a second plurality of substantially parallel conductive electrodes 36. Each plurality of conductive electrodes is on an opposite side of the active media elements. The first plurality of electrodes is substantially perpendicular to the second plurality. Each electrode of the first plurality of electrodes is substantially parallel to and adjacent a corresponding active media element. The electrodes of the second plurality of electrodes are interspersed with a second plurality of substantially parallel opaque elements 39. The second plurality of electrodes is substantially perpendicular to the active media elements. The first and second pluralities of opaque elements form a grid-like pattern (as viewed from the top or bottom of the device) and thus together define the pixel domains. By controlling the voltage applied to each of the first and second pluralities of electrodes, the combined voltage applied at each pixel can be controlled and the light modulation through each pixel can be controlled. Each electrode of the first plurality is configured to apply a voltage to a different column of pixels in the array and each electrode of the second plurality is configured to apply a voltage to a different row of pixels in the array, such that one electrode of the first plurality and one electrode of the second plurality together apply a desired voltage to one pixel. The electrodes, active media elements, and opaque elements all reside on a substrate 38 which may be transparent or reflective.

Referring now to FIGS. 4A and 4B, perspective and exploded views of a dynamic optical grating device are illustrated, in accordance with an alternative embodiment of the invention. The device of FIGS. 4A and 4B have a similar layer structure as that of FIG. 1 (or, alternatively, could have a similar layer structure as that of FIG. 2), but further comprises an opaque material that defines a domain (i.e., physical boundary) of each pixel thereby creating a 4×6 array of pixels. The device 40 of FIGS. 4A and 4B comprises a plurality of active media elements 42 arranged in a matrix of rows and columns, interspersed between a grid-like opaque element 47. The device further comprises electrical circuitry for applying a voltage to the active media elements, the electrical circuitry comprising a first plurality of substantially parallel conductive electrodes 44 and a second plurality of substantially parallel conductive electrodes 46. Each plurality of conductive electrodes is on an opposite side of the active media elements. The first plurality of electrodes is substantially perpendicular to the second plurality. Each electrode of the first plurality of electrodes is substantially parallel to and adjacent a corresponding column of active media elements. Each electrode of the second plurality of electrodes is substantially parallel to and adjacent a corresponding row of active media elements. By controlling the voltage applied to each of the first and second pluralities of electrodes, the combined voltage applied at each pixel can be controlled and the light modulation through each pixel can be controlled. The electrodes, active media elements, and opaque elements all reside on a substrate 48 which may be transparent or reflective.

Referring now to FIGS. 5A and 5B, perspective and exploded views of a dynamic optical grating device are illustrated, in accordance with another alternative embodiment of the invention. The device of FIGS. 5A and 5B have a similar layer structure as that of FIG. 1 (or, alternatively, for example, could have a similar layer structure as that of FIG. 2), but further comprises opaque material that defines a domain (i.e., physical boundary) of each pixel thereby creating a 4×6 array of pixels The device 50 of FIGS. 5A and 5B comprises a single active media element 52. The device further comprises electrical circuitry for applying a voltage to the active media elements, the electrical circuitry comprising a first plurality of substantially parallel conductive electrodes 54 and a second plurality of substantially parallel conductive electrodes 56. Each plurality of conductive electrodes is on an opposite side of the active media element 52. The first plurality of electrodes is substantially perpendicular to the second plurality. The electrodes of the first plurality of electrodes are interspersed with a first plurality of substantially parallel opaque elements 53. The electrodes of the second plurality of electrodes are interspersed with a second plurality of substantially parallel opaque elements 57. The first and second pluralities of opaque elements form a grid-like pattern (as viewed from the top or bottom of the device) and thus together define the pixel domains. By controlling the voltage applied to each of the first and second pluralities of electrodes, the combined voltage applied at each pixel can be controlled and the light modulation through each pixel can be controlled. Each electrode of the first plurality is configured to apply a voltage to a different column of pixels in the array and each electrode of the second plurality is configured to apply a voltage to a different row of pixels in the array, such that one electrode of the first plurality and one electrode of the second plurality together apply a desired voltage to one pixel. The electrodes, active media elements, and opaque elements all reside on a substrate 58 which may be transparent or reflective.

The quantity and configuration of active media elements, opaque elements, and conductive electrodes in FIGS. 3A, 3B, 4A, 4B, 5A, and 5B is illustrative of three possible embodiments of the invention and is not intended to be limiting. The light blocking layer and associated defined apertures are not illustrated in FIGS. 3A, 3B, 4A, 4B, 5A, and 5B for clarity. In the array devices (such as those illustrated in FIGS. 3A, 3B, 4a, 4B, 5A, and 5B), each pixel or cell can be directly connected to the upper and lower conductive electrodes or can have a state selection circuit which holds the state during a short refresh time or permanently. For example, each cell can have a capacitor which holds the electric charge and voltage during a certain time. The stored charge acts upon each cell while the upper and lower conductors choose another cell and program the cell's state to a different value. The methods to program each cell's state include but are not limited to: (1) a capacitor based charge and voltage storage circuit; (2) transistor-based bi-state or multiple-state output circuit; or (3) switching circuit into different voltage or current lines.

Referring now to FIG. 6, a cross-sectional view of a portion of the dynamic optical grating device of FIG. 3A (along the line indicated by the arrows in FIG. 3A) with a transparent substrate 38 is shown, illustrating the modulation of light through five pixels 32. As shown in FIG. 6, incoming light enters the pixels from the top. By controlling the electric or magnetic field applied to the pixels (via conductive electrodes 34, 36), the optical properties of each pixel may be controlled. Each cell may have a different applied electric field and/or magnetic field. As a result, each cell may have a different index of refraction (indicated as $n_1$-$n_5$) and extinction coefficient. Thus the phase and intensity of the transmitted or reflected light is changed, based on the applied electric field and/or magnetic field. More importantly, the phase of the light from each cell is controlled by the electric signal. Because of the electrically controlled optical phase, the collective lights from all cells can form constructive or destructive interference on certain target points (on the opposite side of the device from the light source) designated by the electric signals on the array device. This electrically controlled interference of the light gives the capability to control the spectral properties of the light, including intensity distribution, wavelength and optical energy selection, and light propagation direction, all without the disadvantages of mechanically moving geometric structures to control the optical phase of the light.

Referring now to FIG. 7, a cross-sectional view of a portion of the dynamic optical grating device of FIG. 3A with a reflective substrate is shown, illustrating the modulation of light through five pixels. The optical properties of the pixels of FIG. 7 can be controlled as described above in conjunction with FIG. 6. In the device of FIG. 7, due to the reflective substrate, the constructive or destructive interference can be formed on certain target points on the same side of the device from the light source.

Referring now to FIG. 8, the propagation of light by media having different indices of refraction is illustrated. The frequency of light can be written as $$v = \frac{c}{\lambda}.$$

When light of wavelength $\lambda_0$ enters from a media with an index of refraction $n_0$ to a media with an index of refraction $n_1$, the wavelength of the light in the media $n_1$ changes to $$\lambda_1 = \lambda_0 \frac{n_0}{n_1}.$$

According to Snell's law, the relationship is given as, $n_0 \sin \theta_0 = n_1 \sin \theta_1$. The electric field of the propagating light can be expressed as $$\vec{E}_k(r, t) = \vec{E}_{k0} \cos\left(\omega t + \delta_k - \frac{2\pi n}{\lambda} \cdot r\right),$$

where k is p or s polarization, $\vec{E}_{k0}$ is the amplitude of the electric field, $\omega$ is the angular frequency ($\omega = 2\pi v$), and $\delta_k$ is the phase angle of the light.

More generally, the electric field of the propagating light can be described with the real part of the exponential of the imaginary number i, as follows:

$$\vec{E}_k(\vec{r}, t) = \vec{E}_{k0} e^{i(\omega t - \vec{k} \cdot \vec{r} + \delta_k)} = \vec{E}_{k0} e^{i(\omega t - \frac{2\pi n}{\lambda} r + \delta_k)}$$

(for propagating parallel light, such as a laser); or $$\vec{E}_k(\vec{r}, t) = \vec{E}_{k0} \frac{e^{i(\omega t - \vec{k} \cdot \vec{r} + \delta_k)}}{r} = \vec{E}_{k0} \frac{e^{i(\omega t - \frac{2\pi n}{\lambda} r + \delta_k)}}{r}$$

(for a point light source).

From the above equations, if there is a change in the index of refraction n, the phase information, $$\omega t - \frac{2\pi n}{\lambda} \cdot r + \delta_k$$

is also changed. Therefore, the spectral property of the exit light is controlled by the index of refraction changes induced by the applied electric field and/or magnetic field.

For the interference, the total electric field from all diffracting elements has to be calculated. Thus the general equation becomes:

$$\vec{E}_{total}(\vec{r}, t) = \int_{all} \overrightarrow{d\vec{r}'} T(\vec{r}') \cdot \vec{E}_k(\vec{r}, \vec{r}', t)$$

$$= \int_{all} \overrightarrow{d\vec{r}'} T(\vec{r}') \cdot \vec{E}_{k0} \cdot e^{i\left(\omega t - \frac{2\pi n(\vec{r}')}{\lambda} |\vec{r}' - \vec{r}| + \delta_k(\vec{r}')\right)}$$

(for propagating parallel light, such as a laser), or $$\vec{E}_{total}(\vec{r}, t) = \int_{all} \overrightarrow{d\vec{r}'} T(\vec{r}') \cdot \vec{E}_k(\vec{r}, \vec{r}', t)$$

$$= \int_{all} \overrightarrow{d\vec{r}'} T(\vec{r}') \cdot \vec{E}_{k0} \cdot \frac{e^{i\left(\omega t - \frac{2\pi n(\vec{r}')}{\lambda} |\vec{r}' - \vec{r}| + \delta_k(\vec{r}')\right)}}{|\vec{r}' - \vec{r}|}$$

(for a point light source);

where, $T(\vec{r}^1)$ is the transmission or reflection function at the point of the integration, $\vec{r}^1$ Therefore, by changing the index of refraction of the device elements with the applied electric or magnetic field, the diffraction patterns are also changed. Thus, the spectral response of the array device is controlled with the electric signal without any mechanically moving parts. This theory explains the working principles of the present invention. At the very small aperture size, a plasmon induced transmission enhancement occurs. The use of this phenomenon can be included in the device design, too.

Embodiments of the present invention can control the diffraction patterns of transmitted or reflected light using an applied electric or magnetic field and without moving parts mechanically. The associated circuit can hold the electric or magnetic status of each cell while each circuit can be programmed from external connections. Thus, the diffraction patterns can be programmed from an external circuit. Since the embodiments of the present invention work with an applied electric or magnetic field alone and without mobile mechanical parts, the operation speed can be very fast when compared with existing MEMS devices. Also the moving parts in MEMS device can suffer from aging and the effects of friction over time, but the embodiments of the present invention have little or no aging effects compared to MEMS devices. Unlike most MEMS device, the embodiments of the present invention can work in the transmission mode.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed as new and desirable to be secured by Letters Patent of the United States is:

1. A dynamic optical grating device comprising:
   an array of pixels, each pixel comprising an active media material configured to control an optical phase and an intensity of light passing through each pixel upon application of an electric or magnetic field, wherein the optical phase and the intensity of light passing through each pixel is controlled such that the collective light from a plurality of the pixels forms constructive or destructive interference at one or more target points; and
   electrical circuitry configured to apply a desired electric or magnetic field to the pixels wherein the electrical circuitry comprises,
   first and second pluralities of substantially parallel conductive electrodes, each plurality on an opposite side of the pixel array, the first plurality being substantially perpendicular to the second plurality;
   wherein each electrode of the first plurality is configured to apply a voltage to a different column of pixels and each electrode of the second plurality is configured to apply a voltage to a different row of pixels such that one electrode of the first plurality and one electrode of the second plurality together apply a desired voltage to one pixel.

2. The grating device of claim 1, wherein the electrical circuitry further comprises first and second pluralities of semiconductor elements located between the active media material and the first and second pluralities of electrodes, respectively.

3. A method of modulating light, the method comprising the steps of:
   providing a dynamic optical grating device, the grating device comprising (1) an array of pixels, each pixel comprising an active media material configured to control an optical phase an intensity of light passing through each pixel upon application of an electric field, wherein the optical phase and the intensity of light passing through each pixel is controlled such that collective light from a plurality of the pixels forms constructive or destructive interference at one or more target points, and (2) electrical circuitry configured to apply a desired electric or magnetic field to the pixels; and
   applying, by the electrical circuitry, the desired electric or magnetic field to the pixels to control the optical phase and the intensity of light passing through each pixel in a desired manner, wherein the electrical circuitry comprises:
   first and second pluralities of substantially parallel conductive electrodes, each plurality on an opposite side of the pixel array, the first plurality being substantially perpendicular to the second plurality;
   wherein each electrode of the first plurality is configured to apply a voltage to a different column of pixels and each electrode of the second plurality is configured to apply a voltage to a different row of pixels such that one electrode of the first plurality and one electrode of the second plurality together apply a desired voltage to one pixel.

4. The method of claim 3, wherein the electrical circuitry further comprises first and second pluralities of semiconductor elements located between the active media material and the first and second pluralities of electrodes, respectively.

5. A dynamic optical grating device comprising:
   an active media material layer configured to control an optical phase and an intensity of light passing through the active media material layer upon application of an electric or magnetic field, wherein the optical phase and the intensity of light passing through the active media layer is controlled such that the light forms constructive or destructive interference at one or more target points; and
   first and second field injection layers on opposite sides of the active media layer configured to apply a desired electric or magnetic field to the active media material layer, wherein the first and second field injection layers comprise, respectively, first and second transparent conductive electrodes, the first electrode being configured to apply a first voltage and the second electrode being configured to apply a second voltage such that the first and second electrodes together apply a desired voltage to the active media material layer; and wherein the first and second field injection layers further comprise first and second semiconductor layers located between the active media material and the first and second electrodes, respectfully.

6. The grating device of claim 5, wherein the active media material layer is selected from the group consisting of intrinsic semiconductor, extrinsic semiconductor, ceramic, organic molecules, non-linear optical crystal, liquid crystal, ferroelectric material, and piezoelectric material.

7. The grating device of claim 5, further comprising:
   a substrate layer supporting the active media material layer and the first and second field injection layers, the substrate comprising a reflective material or a transparent material.

8. The grating device of claim 5, further comprising:
   an opaque layer defining a plurality of apertures.

9. A dynamic optical grating device comprising:
   an active medial material layer configured to change at least one optical property upon application of an electric or magnetic field; and
   first and second field injection layers on opposite sides of the active medial layer configured to apply a desired electric or magnetic field to the active media material layer;
   wherein the first and second field injection layers comprise, respectively, first and second transparent conductive electrodes, the first electrode being configured to apply a first voltage and the second electrode being configured to apply a desired voltage to the active medial material layer; and
   wherein the first and second field injection layers further comprise first and second semiconductor layers located between the active medial material and the first and second electrodes, respectively.

* * * * *